(12) United States Patent
Hoffmann (10) Patent No.: US 9,043,750 B2
(45) Date of Patent: May 26, 2015

(54) AUTOMATED GENERATION OF TWO-TIER MOBILE APPLICATIONS

(71) Applicant: Martin Hoffmann, Heidelberg (DE)

(72) Inventor: Martin Hoffmann, Heidelberg (DE)

(73) Assignee: SAP SE, Walldorf (DE)

( * ) Notice: Subject to any disclaimer, the term of this patent is extended or adjusted under 35 U.S.C. 154(b) by 154 days.

(21) Appl. No.: 13/648,011

(22) Filed: Oct. 9, 2012

(65) Prior Publication Data

US 2014/0101635 A1 Apr. 10, 2014

(51) Int. Cl.
*G06F 9/45* (2006.01)
*G06F 9/44* (2006.01)

(52) U.S. Cl.
CPC ... *G06F 8/30* (2013.01); *G06F 8/20* (2013.01); *G06F 8/24* (2013.01)

(58) Field of Classification Search
CPC ... G06F 9/4443; G06F 17/30569; G06F 8/61; G06F 15/177; G06F 8/65; G06F 9/445; G06F 17/30442; G06F 8/24; G06F 17/30292; G06F 17/30604; G06F 17/30554; G06F 17/3056; G06F 17/30943; G06F 8/30
See application file for complete search history.

(56) References Cited

U.S. PATENT DOCUMENTS

| | | | | |
|---|---|---|---|---|
| 6,449,050 | B1 * | 9/2002 | Haikin | 358/1.1 |
| 6,574,637 | B1 * | 6/2003 | Lindsey | 707/714 |
| 8,261,231 | B1 * | 9/2012 | Hirsch et al. | 717/100 |
| 8,365,203 | B2 * | 1/2013 | Wong et al. | 719/328 |
| 2002/0087500 | A1 * | 7/2002 | Berkowitz et al. | 707/1 |
| 2003/0033277 | A1 * | 2/2003 | Bahulkar et al. | 707/1 |
| 2004/0250238 | A1 * | 12/2004 | Singh et al. | 717/108 |
| 2005/0198618 | A1 * | 9/2005 | Lalonde et al. | 717/110 |
| 2007/0282889 | A1 * | 12/2007 | Ruan et al. | 707/102 |
| 2008/0046440 | A1 * | 2/2008 | Estes | 707/100 |
| 2010/0082686 | A1 * | 4/2010 | Waring et al. | 707/785 |
| 2011/0145710 | A1 | 6/2011 | Albert et al. | |
| 2011/0209128 | A1 * | 8/2011 | Nikara et al. | 717/140 |
| 2012/0137270 | A1 * | 5/2012 | Ortiz | 717/106 |

(Continued)

OTHER PUBLICATIONS

Alison Bourke et al.; Feasibility study and methodology to create a quality-evaluated database of primary care data; 2004 PHCSG; pp. 171-177; <http://www.ingentaconnect.com/content/bcs/ipc/2004/00000012/00000003/art00007>.*

(Continued)

*Primary Examiner* — Thuy Dao
*Assistant Examiner* — Cuong V Luu
(74) *Attorney, Agent, or Firm* — Fish & Richardson P.C.

(57) ABSTRACT

The disclosure generally describes computer-implemented methods, software, and systems for creating and using two-tier mobile applications. A computer-implemented method includes identifying at least a portion of a database to be associated with a mobile application, retrieving a set of metadata associated with the at least a portion of the identified database, automatically generating a set of mobile application source code for directly accessing the at least a portion of the database based on the set of retrieved metadata, and compiling the set of mobile application source code into a distributable mobile application, the distributable mobile application configured to directly access the identified database associated with the mobile application. In some instances, the identifying, retrieving, generating, and compiling operations are performed at design time, while at runtime, the mobile application is executable by a mobile device and, during runtime execution, can request database-related information directly from the identified database.

19 Claims, 6 Drawing Sheets

(56) References Cited

U.S. PATENT DOCUMENTS

| | | | |
|---|---|---|---|
| 2012/0167047 A1* | 6/2012 | Wyler et al. | 717/122 |
| 2012/0284696 A1* | 11/2012 | Koskinen | 717/126 |
| 2013/0054674 A1* | 2/2013 | Myers et al. | 709/203 |
| 2013/0247005 A1* | 9/2013 | Hirsch et al. | 717/121 |

OTHER PUBLICATIONS

Bala Iyer et al.; Providing Database as a Service; 2002 IEEE; 10 pages; <http://ieeexplore.ieee.org/stamp/stamp.jsp?tp=&arnumber=994695>.*

T G. Price et al.; Access path selection in a relational database management system; 1979 AM; pp. 23-34; <http://dl.acm.org/citation.cfm?id=582099>.*

Klaus R. Dittrich et al.; DAMOKLES—A Database System for Software Engineering Environments; 1986 Springer; pp. 353-371; <http://link.springer.com/chapter/10.1007/3-540-17189-4_107>.*

Keith A Jolley et al.; mlstdbNet—distributed multi-locus sequence typing (MLST) databases; 2004 BMC; 4 pages; <http://www.biomedcentral.com/1471-2105/5/86/>.*

Jim Gemmell et al.; MyLifeBits a personal database for everything; 2006 ACM; pp. 88-95; <http://dl.acm.org/citation.cfm?id=1107460>.*

Scaffold (programming), http://en.wikipedia.org/w/index.php?title=Scaffold_(programming)&oldid=516796488 (last visited Oct. 9, 2012).

Adobe Integrated Runtime, http://en.wikipedia.org/w/index.php?title=Adobe_Integrated_Runtime&oldid=515968370

Wikipedia, Categories: 2008 Software (last edited Oct. 4, 2012), 7 pages.

* cited by examiner

# AUTOMATED GENERATION OF TWO-TIER MOBILE APPLICATIONS

TECHNICAL FIELD

The present disclosure relates to computer-implemented methods, software, and systems for creating and using two-tier mobile applications.

BACKGROUND

Current mobile applications are generally built on a three-tier architecture consisting of a database server (a data tier), an application server (a logic tier), and a client or front-end system (a presentation tier). The various tiers are generally developed and maintained as independent modules, often on separate platforms. The client provides the user interface of the application, which is used to translate tasks and results to information the user can understand, as well as to allow users to submit instructions to the logic and data tiers. The logic tier coordinates the application, processes commands, and makes logical decisions and evaluations, and performs calculations, as well as moving data between the presentation tier and the data tier. The data tier stores and retrieves data and other information from a database or other file system. The information is passed to the logic tier for processing, and then back to the user for consumption.

Database management systems (DBMS) are software packages with computer programs that control the creation, maintenance, and use of a database. They allow organizations to conveniently develop databases for various applications. A database is an integrated collection of data records, files, and other objects. A DBMS allows different user application programs to concurrently access the same database. A DBMS provides facilities for controlling data access, enforcing data integrity, managing concurrency control, and recovering the database after failures and restoring it from backup files, as well as maintaining database security.

An in-memory database is a DBMS that primarily relies on main memory for computer data storage. It is contrasted with DBMSs which employ a disk storage mechanism. Main memory databases are faster than disk-optimized databases since the internal optimization algorithms are simpler and execute fewer CPU instructions. Accessing data in memory reduces the I/O reading activity when querying the data, which provides faster and more predictable performance than disk.

SUMMARY

The disclosure generally describes computer-implemented methods, software, and systems for creating and using two-tier mobile applications. A computer-implemented method includes identifying at least a portion of a database to be associated with a mobile application, retrieving at least a set of metadata associated with the at least a portion of the identified database, automatically generating a set of mobile application source code for directly accessing the at least a portion of the database based on the set of retrieved metadata, and compiling the set of mobile application source code into a distributable mobile application, the distributable mobile application configured to directly access the identified database associated with the mobile application. In some instances, the identifying, retrieving, generating, and compiling operations are performed at design time, while at runtime, the mobile application is executable by a mobile device and, during runtime execution, can request database-related information directly from the identified database.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure generally describes computer-implemented methods, software, and systems for creating and using two-tier mobile applications. Currently, the enterprise IT industry is moving to build native mobile applications and frontends for different mobile application platforms (e.g., iOS™, Android™, and Windows Phone™, among others) for server applications. In the past, three-tier architecture-based applications consisting of a database server, an application server, and a client or other frontend would be used. The advent of in-memory database systems, such as SAP's HANA, together with easy-to-consume database interfaces (i.e., HTTP/RESTful), allows the possibility to build mobile applications directly on top of the server-side database management system (DBMS). In other words, the mobile applications can directly communicate with the DBMS for access to stored data. While in-memory databases may be used, other suitable non-in-memory databases and DBMSs may be used to achieve similar benefits. This process provides a significantly lower total cost of ownership (TCO) and complexity, removing the need for application server caches, particularly when used with fast, in-memory databases. However, a significant development effort (e.g., boilerplate code) is needed to build even simple mobile applications, and this effort has to be done per mobile platform, each different from the others. To leverage rapid application development and prototyping, this disclosure describes a mobile application generator to minimize the effort to build simple mobile CRUD (create/read/update/delete) applications directly on the database.

During development time of the mobile application, the mobile application generator can be used to define and create the two-tier applications. The generator application can retrieve at least a portion of database table definitions associated with the underlying database via a RESTful application programming interface (API), Java database connectivity (JDBC), or other suitable interface/call, that provides metadata about the database's data model. The developer can select one or more tables and/or database objects to use in the application, and the mobile application generator can generate native source code for a specified client platform (e.g. iOS™ or Android™). The native source code may follow an MVC (Model//View/Controller) or MVVM (Model//View/View Model) pattern, as appropriate. Some source code may be generated for the model and controller (in a programming language such as Java™, C#, or Objective-C), as well as a view definition (such as an XML document for Android™ and Windows Phone™).

Additionally, some coding may be generated by the mobile application generator for managing the connectivity to the database system needed during runtime. The generated coding can be similar to database objects represented in the real world—that is, the supported actions of the user can comprise creation, reading, updating and deletion of one of these real-world objects. The similarity of these actions is one of the reasons why the automated mobile application generator is possible. In instances where associations exist between multiple database objects (e.g., a sales order having different line items, including those stored in a separate table) the application coding for these can also be generated—automatically, in some cases—if needed.

The generated native mobile application can then be used at runtime similar to any other mobile application, and can provide direct database access with general CRUD actions. In further development cycles, the developer can then adapt or revise the generated coding in case more sophisticated features are needed or desired.

Figure 1:
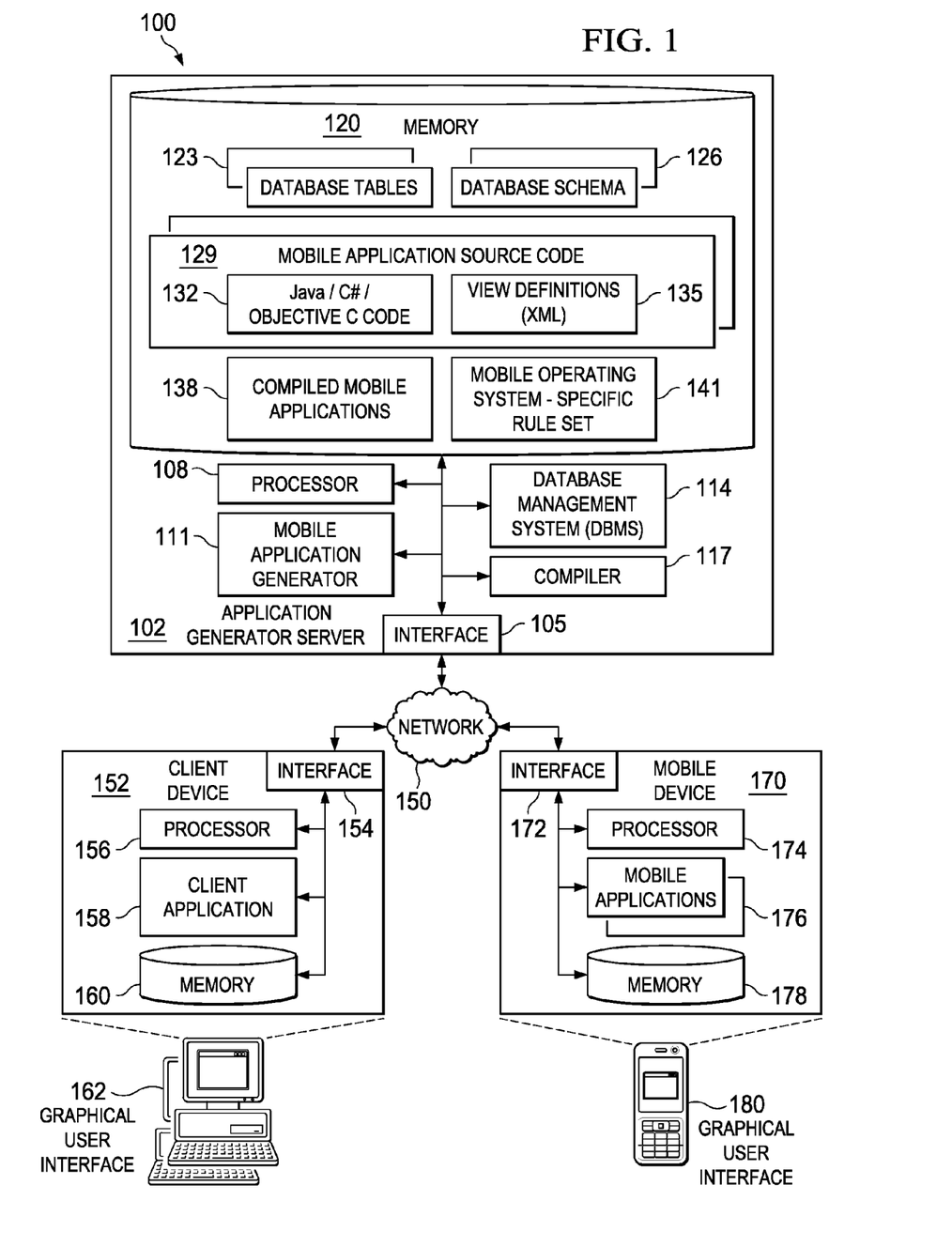
FIG. 1 is a block diagram illustrating an example environment for creating and using two-tier mobile applications.

FIG. 1 is a block diagram illustrating an example environment 100 for creating and using two-tier mobile applications. Specifically, the illustrated environment 100 includes, or is communicably coupled with, an application generator server 102, a client device 152, a mobile device 170, and a network 150. For example, a user interacting with user interfaces presented on the client device 152 may access a mobile application generator 111 to generate mobile application source code 129 on the application generator server 102. Similarly, the mobile device 170 can download one or more compiled mobile applications 138 from the application generator server 102, storing and executing them as mobile applications 176 on the mobile device 170.

The application generator server 102 is a server or plurality of servers capable of performing functions associated with creation and modification of mobile applications, particularly those generated automatically using a mobile application generator 111. The application generator server 102 may be part of an end-to-end enterprise resource planning system and/or a software development environment. In some implementations, the application generator server system 102 may store, execute, or be associated with a plurality of applications in addition to the mobile application generator 108. As illustrated, in fact, the application generator server 102 includes a database management system (DBMS) 114 that may be used to manage one or more database tables 123 and database schema 126 for use with generated mobile applications. In other implementations, the relevant databases, including the DBMS 114, and any other suitable information, may be located external to the application generator server 102 in a dedicated database system. In some implementations, the application generator server 102 may comprise or be associated with at least one Web server, where the mobile application generator 111 represents one or more Web-based applications accessed and executed by the client device 152 via the network 150 or directly at the application generator server 102 to perform the programmed tasks or operations of the mobile application generator 111.

At a high level, the application generator server 102 comprises an electronic computing device operable to receive, transmit, process, store, or manage data and information associated with the environment 100. Specifically, the application generator server 102 illustrated in FIG. 1 is responsible for receiving application requests, for example, mobile application generation requests, from one or more client applications 158 or mobile applications 176 associated with the client device 152 and/or the mobile device 170, respectively, of the environment 100 and, further, responding to the received requests by processing said requests in the associated mobile application generator 111 and/or DBMS 114 and sending the appropriate responses to the requested applications. In addition to those requests, requests associated with both the mobile application generator 111 and/or the DBMS 114 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single application generator server 102, environment 100 can be implemented using two or more servers, as well as computers other than servers, including a server pool. Indeed, the application generator server 102 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, illustrated application generator server 102 may be adapted to execute any operating system, including Linux, UNIX, Windows, Mac OS®, Java™, Android™, iOS™ or any other suitable operating system. According to one implementation, application generator server 102 may also include or be communicably coupled with an e-mail server, a Web server, a caching server, a streaming data server, and/or other suitable server. Similar flexibility and variation may be associated with the other components illustrated in FIG. 1, including client device 152 and mobile device 170, each of which may be comprised of different components, component types, and operating systems in different implementations.

The application generator server 102 also includes an interface 105, a processor 108, and a memory 120. The interface 105 is used by the application generator server 102 for communicating with other systems in a distributed environment—including within the environment 100—connected to the network 150, for example, the client device 152 and/or the mobile device 170, as well as other systems communicably coupled to the network 150 (not illustrated). Generally, the interface 105 comprises logic encoded in software and/or hardware in a suitable combination and operable to communicate with the network 150. More specifically, the interface 105 may comprise software supporting one or more communication protocols associated with communications such that the network 150 or interface's hardware is operable to communicate physical signals within and outside of the illustrated environment 100.

Generally, the application generator server 102 (and other components within environment 100) may be communicably coupled with a network 150 that facilitates wireless or wireline communications between the components of the environment 100, as well as with any other local or remote computer, such as additional clients, servers, or other devices communicably coupled to network 150, including those not illustrated in FIG. 1. In the illustrated environment, the network 150 is depicted as a single network, but may be comprised of more than one network without departing from the scope of this disclosure, so long as at least a portion of the network 150 may facilitate communications between senders and recipients. In some instances, one or more of the components associated with the system may be included within the network 150 as one or more cloud-based services or operations.

The network 150 may be all or a portion of an enterprise or secured network, while in another instance, at least a portion of the network 150 may represent a connection to the Internet. In some instances, a portion of the network 150 may include a portion of a cellular or mobile data network or other network capable of relaying short message service (SMS) or multimedia messaging service (MMS) messages, as well as other suitable mobile data messaging. In some instances, a portion of the network 150 may be a virtual private network (VPN). Further, all or a portion of the network 150 can comprise either a wireline or wireless link. Example wireless links may include 802.11a/b/g/n, 802.20, WiMax, 3G, 4G (i.e., LTE), and/or any other appropriate wireless link. In other words, the network 150 encompasses any internal or external network, networks, sub-network, or combination thereof operable to facilitate communications between various computing components inside and outside the illustrated environment 100. The network 150 may communicate, for example, Internet Protocol (IP) packets, Frame Relay frames, Asynchronous Transfer Mode (ATM) cells, voice, video, data, and other suitable information between network addresses. The network 150 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the application generator server 102 includes a processor 108. Although illustrated as a single processor 108 in FIG. 1, two or more processors may be used according to particular needs, desires, or particular implementations of the environment 100. Each processor 108 may be a central processing unit (CPU), a blade, an application specific integrated circuit (ASIC), a field-programmable gate array (FPGA), or another suitable component. Generally, the processor 108 executes instructions and manipulates data to perform the operations of the application generator server 102. Specifically, the processor 108 executes the functionality required to receive and respond to requests from the client device 152 and the mobile device 170, as well as to perform the operations associated with the mobile application generator 111 and the application generator server 102 as a whole, and those components' related modules and functionality.

Regardless of the particular implementation, "software" may include computer-readable instructions, firmware, wired and/or programmed hardware, or any combination thereof on a tangible medium (transitory or non-transitory, as appropriate) operable, when executed, to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The application generator server 102 is illustrated as including several applications, modules, and other software to be executed by the processor 108, including the mobile application generator 111, the DBMS 114, and the compiler 117. As described earlier, the mobile application generator 111 can be any application, program, or other software for managing and performing operations associated with generating mobile applications that can directly access the DBMS 114 and its associated database tables 123 and database schema 126, as opposed to accessing an application layer when requesting data from the backend. In some instances, the mobile application generator 111 may work in conjunction with one or more of the other modules illustrated in FIG. 1, such as the DBMS 114 and the compiler 117.

The DBMS 114 controls the creation, maintenance, and access to at least one database. While illustrated within the application generator server 102, the DBMS 114 and the respective database components (e.g., database tables 123, database schema 126) may be stored and located in a specific database system. The DBMS 114 and its databases are shown within the application generator server 102 in FIG. 1 for convenience of illustration, and are not meant to be limiting. In general, the DBMS 114 can operate with the mobile application generator 111, during application development, to allow users to identify one or more database tables or views to be used in the mobile application being developed. The mobile application generator 111 can request and/or retrieve a listing of the database schemas 126 for the various database tables 123 and views that exist at the time of development, and can allow particular views and tables to be selected as relevant to the application. When the application is generated, the selected tables and views can be incorporated into the application's coding. After a particular mobile application is created, compiled, and is used at a mobile device 170, requests for information from the database tables 123 associated with the corresponding executing mobile application 176 are sent to the DBMS 114. The DBMS 114 can then access and return the information to the mobile application 176, and, in some instances, allow the mobile application 176 and associated user to also create, update, and delete portions of the database tables 123.

The compiler 117 is a computer program or module that transfers a set of mobile application source code 129 defined for a new mobile application (and created by the mobile application generator 111) into an executable program. The mobile application source code 129 generated by the mobile application generator 111 may be generated in any suitable formats, including a set of Java™, C#, and/or Objective C code 132, as well as a set of view definitions (e.g., in XML) 135. The set of Java™/C#/Objective C code 132 may be code defined for a model and controller of the mobile application, as well as the view definition 135, allowing a model/view/controller and/or a model/view/view model pattern to be followed. In some instances, the mobile application source code 129 can be compiled into multiple types of mobile applications. A set of mobile OS-specific rules 141 may be used to define how the generated source code 129 is compiled. For example, if a mobile application is meant to be created for iOS™, an iOS-specific set of rules will be used by the compiler 117 to generate the compiled mobile applications 138. Rule sets 141 for other mobile OS may also be available, including Android, Windows Mobile™, Blackberry® OS, and others. The compiled mobile applications 138 can be disseminated or made available to one or more mobile devices 170 using any suitable delivery mechanism, including app stores, email, push delivery, or others, as appropriate.

Memory 120 may be a single or multiple memories. The memory 120 may include any type of memory or database module and may take the form of volatile and/or non-volatile memory including, without limitation, magnetic media, optical media, random access memory (RAM), read-only memory (ROM), removable media, or any other suitable local or remote memory component. The memory 120 may store various objects or data, including caches, classes, frameworks, applications, backup data, business objects, jobs, web pages, web page templates, database tables, repositories storing business and/or dynamic information, product information, customer information, sales person information, and any other appropriate information including any parameters, variables, algorithms, instructions, rules, constraints, or references thereto associated with the purposes of the application generator server 102. Additionally, the memory 120 may include any other appropriate data, such as VPN applications, firmware logs and policies, firewall policies, a security or access log, print or other reporting files, as well as others. As illustrated in FIG. 1, memory 120 includes the database information (database tables 123 and database schema 126), the mobile application source code 129, the compiled mobile applications 138, and the mobile OS-specific rule sets 141 used for compiling mobile application source code 129, each described above.

The illustrated environment of FIG. 1 also includes the client device 152, or multiple client devices 152. The client device 152 may be any computing device operable to connect to or communicate with at least the application generator server 102 via the network 150 using a wireline or wireless connection. In general, the client device 152 comprises an electronic computer device operable to receive, transmit, process, and store any appropriate data associated with the environment 100 of FIG. 1. In more specificity, the client device 152 may be associated with a user or developer working with the mobile application generator 111 to define and generate one or more mobile applications.

The illustrated client device 152 includes a client application 158. The client application 158 is any type of application that allows the client device 152 to perform a transaction or interaction with the application generator server 102. In some implementations, the client application 158 can be and/or include a Web browser. In some implementations, the client application 158 can be used to present information from the mobile application generator 111, such as one or more data sets or schemas from the database tables 123 and/or database schema 126, as well as to define the design of a particular mobile application. The client application 158 can also be used to modify previously generated mobile applications to add additional or alternative functionality than that created in the automatic generation process performed by the mobile application generator 111. In some instances, the client application 158 can be used to test newly created or defined mobile applications. The client device 152 may be associated with a development and/or test environment for the generation and testing of mobile applications.

The illustrated client device 152 further includes an interface 154, a processor 156, and a memory 160. The interface 154 is used by the client device 152 for communicating with other systems in a distributed environment—including within the environment 100—connected to the network 150; for example, the application generator server 102, as well as other systems communicably coupled to the network 150 (not illustrated). Generally, the interface 154 comprises logic encoded in software and/or hardware in a suitable combination and operable to communicate with the network 150. More specifically, the interface 154 may comprise software supporting one or more communication protocols associated with communications such that the network 150 or interface's hardware is operable to communicate physical signals within and outside of the illustrated environment 100.

As illustrated in FIG. 1, the client device 152 includes a processor 156. Although illustrated as a single processor 156 in FIG. 1, two or more processors may be used according to particular needs, desires, or particular implementations of the environment 100. Each processor 156 may be a central processing unit (CPU), an application specific integrated circuit (ASIC), a field-programmable gate array (FPGA), or another suitable component. Generally, the processor 156 executes instructions and manipulates data to perform the operations of the client device 152. For example, the processor 156 executes the functionality of the client application 158 required to send requests to the application generator server 102 and to receive and process responses from the same. The graphical user interface (GUI) 162 of the client device 152 can interface with at least a portion of the environment 100 for any suitable purpose, including generating a visual representation of a Web browser, presenting a set of database table metadata and/or data, or performing other suitable actions. In some instances, the GUI 162 may be used to view and navigate various applications and Web pages located both internally and externally to the illustrated system, including the mobile application generator 111 at the application generator server 102.

The GUI 162 may provide a graphical user interface to the mobile application generator 111 operable to, for example, allow the user of the client application 158 to interface with at least a portion of the mobile application generator 111 and its associated operations and functionality, as well as other applications. Generally, the GUI 162 provides the particular user with an efficient and user-friendly presentation of business data provided by or communicated within the system. The GUI 162 may comprise a plurality of customizable frames or views having interactive fields, pull-down lists, and buttons operated by the user. For example, the GUI 162 may provide interactive elements that allow a user to interact with a particular application generator server 102, as well as other components within and/or external to environment 100. The different portions of the application generator server's functionality may be presented and accessible to the user through the GUI 162. In general, the GUI 162 is often configurable, supports a combination of tables and graphs (bar, line, pie, status dials, etc.), and is able to build real-time portals, where tabs are delineated by key characteristics (e.g., site or micro-site). Therefore, the GUI 162 contemplates any suitable graphical user interface, such as a combination of a generic web browser, intelligent engine, and command line interface (CLI) that processes information in the platform and efficiently presents the results to the user visually. In some instances, the client application 158 may be associated with or a remotely executing portion of the mobile application generator 111.

The illustrated client device 152 also includes a memory 160, or multiple memories 160. The memory 160 may be similar to or different from memory 120 of the application generator server 102, and may include any memory or database module and may take the form of volatile or non-volatile memory including, without limitation, magnetic media, optical media, random access memory (RAM), read-only memory (ROM), removable media, or any other suitable local or remote memory component.

There may be any number of client devices 152 associated with, or external to, the environment 100. For example, while the illustrated environment 100 includes one client device 152, alternative implementations of the environment 100 may include multiple client devices 152 communicably coupled to the application generator server 102 and/or the network 150, or any other number suitable to the purposes of the environment 100. Additionally, there may also be one or more additional client devices 152 external to the illustrated portion of environment 100 that are capable of interacting with the environment 100 via the network 150. Further, the term "client" and "user" may be used interchangeably as appropriate without departing from the scope of this disclosure. Moreover, while the client device 152 is described in terms of being used by a single user, this disclosure contemplates that many users may use one computer, or that one user may use multiple computers.

The illustrated client device 152 is intended to encompass any computing device such as a desktop computer, laptop/notebook computer, wireless data port, smart phone, personal data assistant (PDA), tablet computing device, one or more processors within these devices, or any other suitable processing device or computer. For example, the client device 152 may comprise a computer that includes an input device, such as a keypad, touch screen, or other device that can accept user information, and an output device that conveys information associated with the operation of the application generator server 102 or the client device 152 itself, including digital data, visual information, or the GUI 162, as shown with respect to the client device 152.

FIG. 1 further includes at least one mobile device 170, where the mobile device 170 is used to execute the mobile applications 176 generated by the mobile application generator 111. The mobile device 170 includes a mobile application 176, along with an interface 172, processor 174, memory 178, and GUI 180, which may be similar to or different than the components of client device 152. The various components may be specifically designed for the mobile device 170 and/or the operating system associated with the mobile device 170. In some instances, the mobile applications 176 represent distributed versions of at least one of the compiled mobile applications 138 for the particular operating system or platform upon which the mobile device 170 executes. When a mobile application 176 corresponding to one of the compiled mobile applications 138 executes, one or more calls may be made directly to the DBMS 114 based on the specific two-tier communications defined within the source code 129 of the mobile applications 176. By doing so, database calls from the mobile application 176 can be made directly to the DBMS 114 without first calling an application server.

While FIG. 1 is described as containing or being associated with a plurality of elements, not all elements illustrated within environment 100 of FIG. 1 may be utilized in each alternative implementation of the present disclosure. For example, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes, in addition to those purposes described herein.

Figure 2:
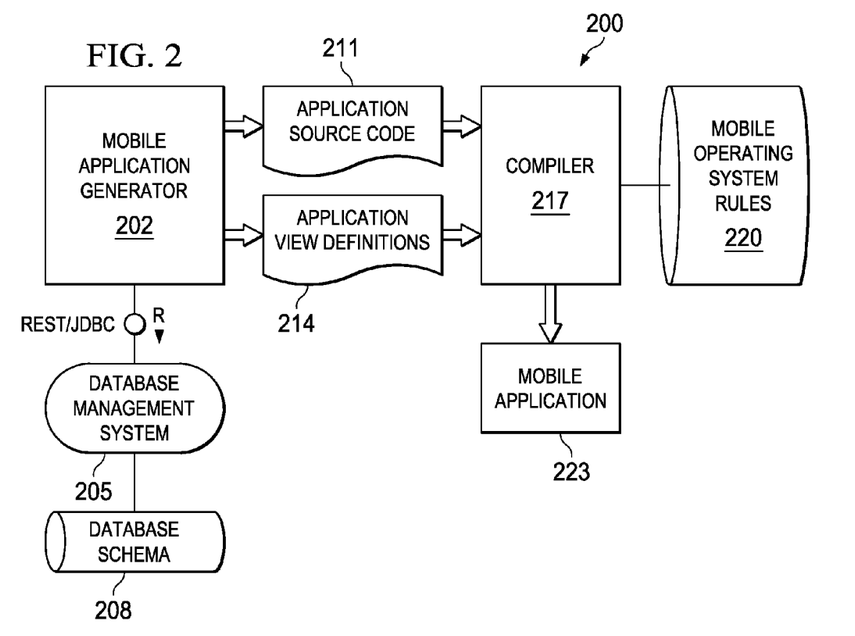
FIG. 2 is a block diagram of a set of design time components and results used in the creation of a two-tier application.

FIG. 2 is a block diagram 200 of a set of design time components and results used in the creation of a two-tier application. For purposes of description, FIG. 2 presents a detailed illustration of an implementation based in part on the example environment 100 described in FIG. 1.

Initially, a mobile application generator 202 is provided. As described, the mobile application generator 202 can be used by a developer to retrieve at least a portion of a database table or database schema, using the retrieved information to assist in creating a new mobile application. The mobile application generator 202 can access a database management system (DBMS) 205 through an appropriate channel, such as the illustrated RESTful API or JDBC channel. The DBMS 205 can access its associated databases, database schemas, and database table definitions to provide metadata about the data model and sample data from the corresponding databases to the mobile application generator 202. The developer can identify one or more portions of the corresponding databases and/or tables within the databases to be included with and/or integrated into the mobile application being generated.

After selection of the relevant database schemas and portions, the mobile application generator 202 can generate native source code for a particular client platform (e.g., iOS™ or Android™). In some instances, a generic set of source code may be generated at this time, with platform-specific compiling performed later. As illustrated, the mobile application generator 202 can generate a set of application source code 211 and a set of application view definitions 214. The application source code 211 can define how the mobile application 223 executes, while the set of application view definitions 214 can define how the information associated with the mobile application 223 is presented. The application source code 211 may be generated in a programming language, such as Java™, C#, Objective C, or another suitable mobile platform-compatible programming language, while the view definitions 214 can be generated as an XML document, for example. While not explicitly shown, additional code for accessing the DBMS 205 at runtime is generated, and particular, for interacting with the backend database, its schema 208, and the underlying data at runtime. The generated database access coding may be used to provide functionality and actions for the user to create, read, update, and delete information and data from the database. In some instances, the database access coding may act upon database objects representing real world-based objects, such as sales orders and invoices. Where associations between database objects exist, such as a sales order object associated with a plurality of line item objects, the application coding generated by the mobile application generator 202 can be generated, as appropriate, based on the understood relationships defined by the database's schema 208 and defined metadata.

Once the source code 211, view definitions 214, and additional coding is created, a compiler 217 may be used to generate executable mobile applications 223. In some instances, the compiler 217 may be used to compile different platform-specific executable mobile applications 223 based on user input or preference. In response to selection of a particular platform, the compiler 217 can access mobile platform-specific rules 220 to determine how the generated code should be compiled. The compiler 217 can then compile and create the corresponding mobile applications 223. Alternatively, two or more compilers may be used for different platforms. For example, a first compiler may exist for iOS™ mobile applications, while a second compiler may exist for Android™ mobile application.

Figure 3:
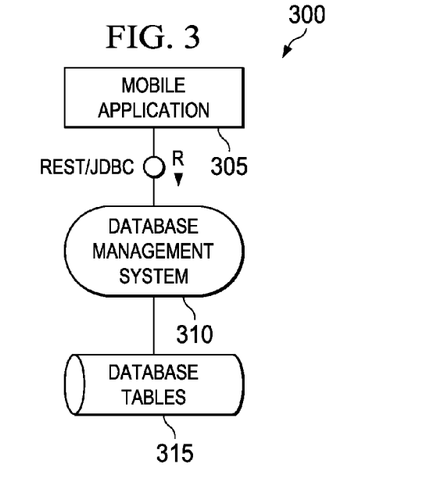
FIG. 3 is a block diagram of a set of run time components and interactions used in the example two-tier application.

FIG. 3 is a block diagram 300 of a set of run time components and interactions used in the example two-tier application. For purposes of description, FIG. 3 presents a detailed illustration of an implementation based in part on the example environment 100 described in FIG. 1, and based on the design time creation process described in FIG. 2.

As illustrated, the mobile application 305 can execute in any suitable environment and mobile platform. Based on the integrated database functionality, when it requires access to a database, the mobile application 305 can submit a call to a pre-defined RESTful API (or via JDBC, or any other suitable connection) associated with the corresponding database management system (DBMS) 310. The DBMS 310 can interpret the request and interact with its database tables 315, as requested, returning any response information or confirmation to the mobile application 305. As such, the mobile application 305 can interact directly with the DBMS 310 and its associated databases based on the connections and integrated functionality generated during the runtime mobile application generation process.

Figure 4:
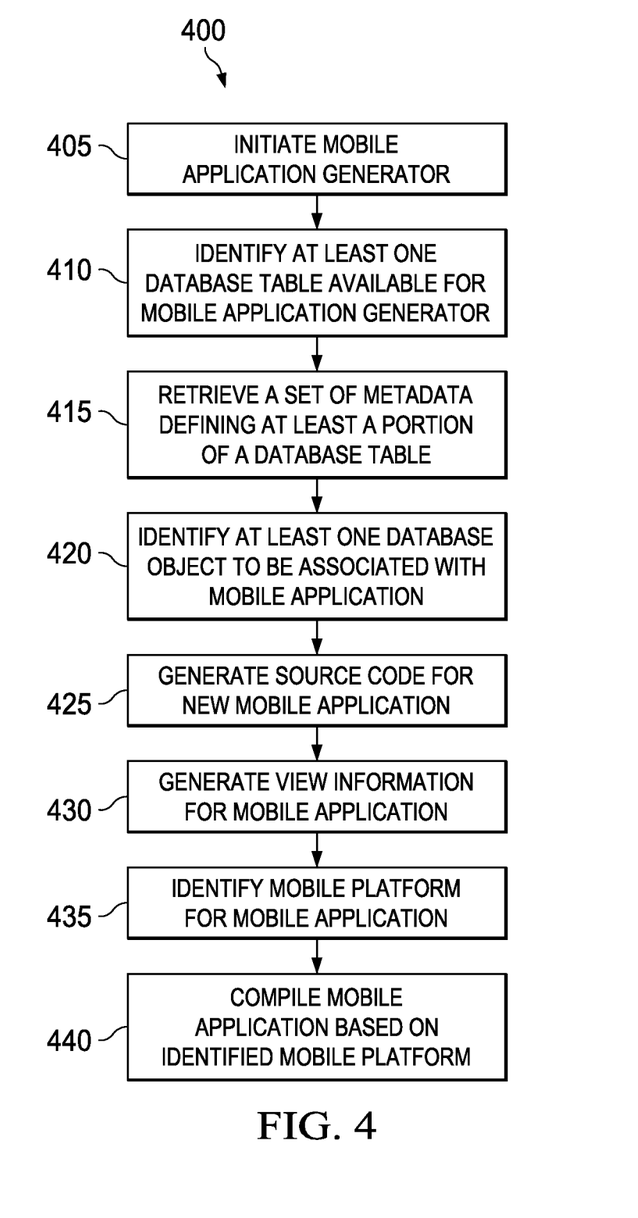
FIG. 4 is a flow chart of an example method for generating a two-tier mobile application using a mobile application generator.

FIG. 4 is a flow chart of an example method 400 for generating a two-tier mobile application using a mobile application generator using, for example, a mobile application generator described above. For clarity of presentation, the description that follows generally describes method 400 in the context of FIGS. 1 through 3. However, it will be understood that method 400 may be performed, for example, by any other suitable system, environment, software, and hardware, or a combination of systems, environments, software, and hardware as appropriate.

At 405, the mobile application generator can be initiated. In some instances, the mobile application generator can be initiated and used from a client device, such as a terminal, laptop, desktop, or other suitable computer. In other instances, the mobile application generator may be initiated and executed on a mobile device, such as a tablet or smartphone. In some instances, the mobile application generator may be a standalone program, while in others, the mobile application generator may be a server-based application accessed remotely by a corresponding client or mobile device, or locally by a user at the server.

At 410, at least one database table available for use in a newly generated mobile application is identified. As previously described, the mobile application generator can be associated with a database management system (DBMS), through which the mobile application generator can identify available database schema and tables for integration with the new mobile application. At 415, a set of metadata defining at least a portion of the identified database table is retrieved. In doing so, the mobile application generator can prepare source code for accessing (i.e., using CRUD actions) the corresponding database tables and their entries. At 420, at least one database object can be associated with the to-be-generated mobile application to enable interactions with the underlying database.

At 425, source code of the to-be-generated mobile application can be generated, where the source code, when compiled and executed, will allow direct access to the database object for two-tier interactions and accessibility. This can include specific calls to the DBMS and the particular database tables associated with the at least one database object. The source code can also provide for other mobile application functionality, including basic actions and methods. Additionally, view information for the mobile application is generated at 430. This can include an XML file for how database-related information may be presented, as well as a description of the mobile application's presentation. In some cases, developers of the mobile application generator can update and/or modify the automatically generated source code and/or view information before compilation to create mobile applications with additional functionality and/or design features. By allowing this modification, the mobile application generator can generate simple and efficient applications with the required direct database functionality, while allowing developers to define additional and advanced functionality through normal programming and design. Non-technical users can create functionality applications to perform their required tasks, while technical users can add detailed and advanced functionality to further enhance the application.

At 435, a mobile application platform for which the mobile application will be compiled is identified. In some instances, the particular mobile application platform may be identified earlier than illustrated herein, including prior to 410's identifying the particular database tables for integration with the mobile application. Earlier selection of the mobile application platform may allow for specialization of coding for the selected platform, where available. As illustrated, the mobile application platform is selected after the source code (425) and view information (430) are generated, but before the mobile application is compiled. When the mobile application platform is identified, a corresponding platform-based compiling rule set may be identified, which can then be used to compile the mobile application accordingly at 440. Once the mobile application is compiled, the compiled mobile application can be distributed or made available, as appropriate (e.g., to a centralized app store), and executed by compatible mobile devices. In some instances, the mobile application platform may be initially selected by a user, such that the mobile application generator only produces the source code and view information for the desired platform.

Figure 5A:
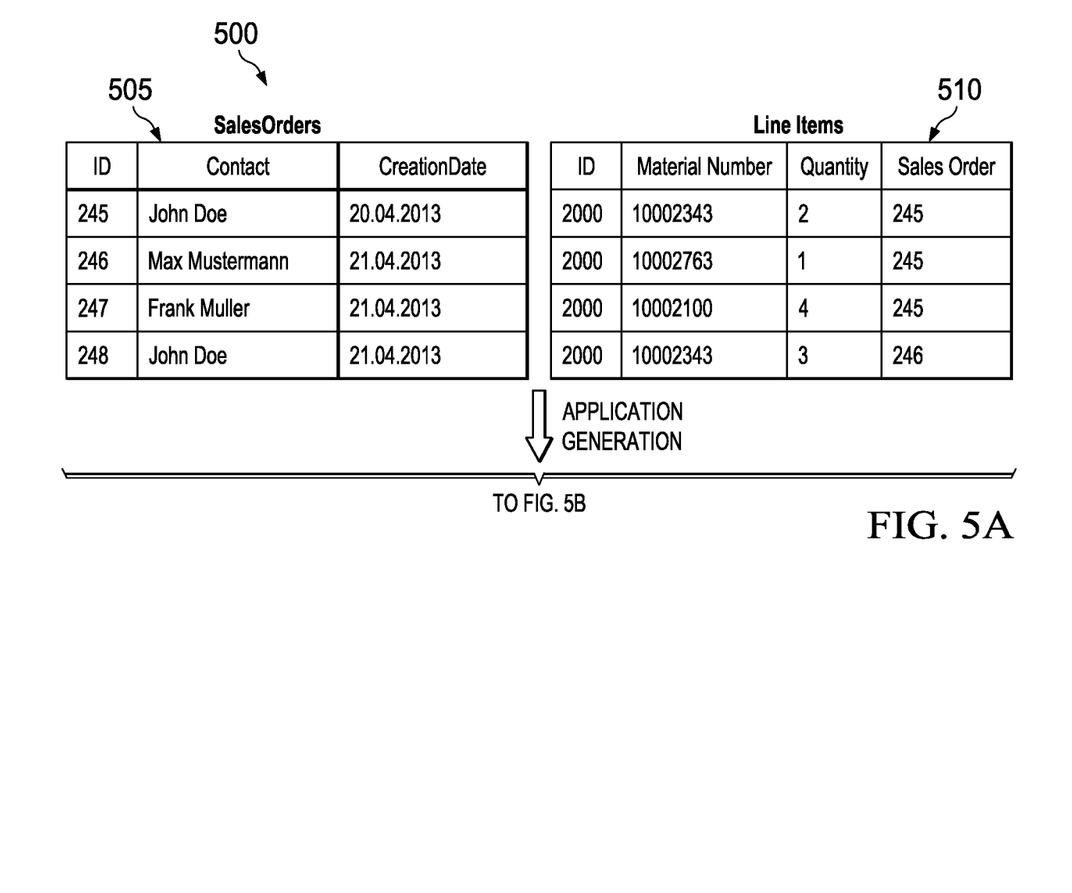
FIGS. 5A, 5B, and 5C provides several illustrations related to the disclosure, including a pair of sample database tables (FIG. 5A), an XML file generated by the mobile application generator (FIG. 5B), and an example screenshot of a generated application executing at runtime on an Android-based mobile device (FIG. 5C).
Figure 5B:
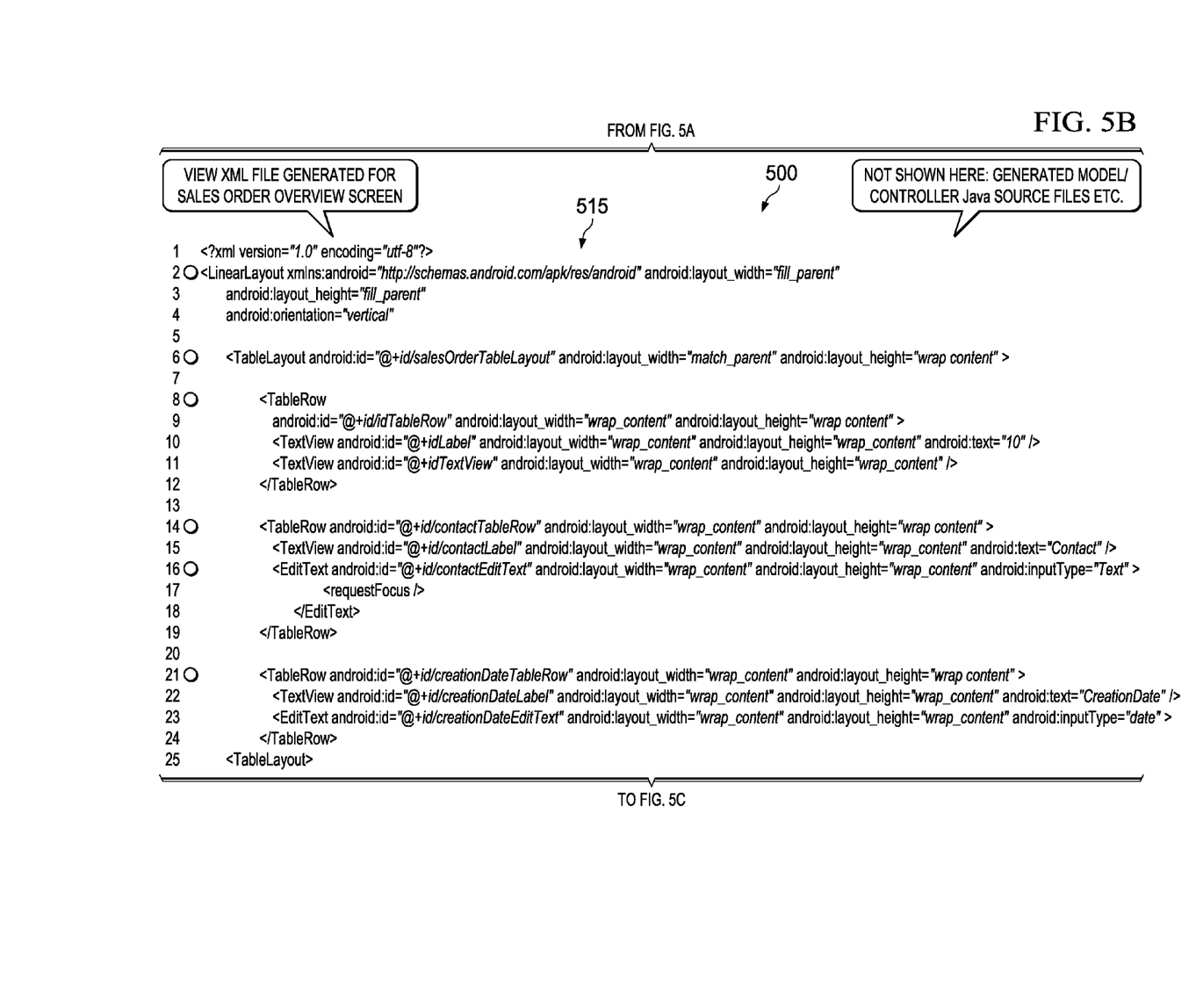
Figure 5C:
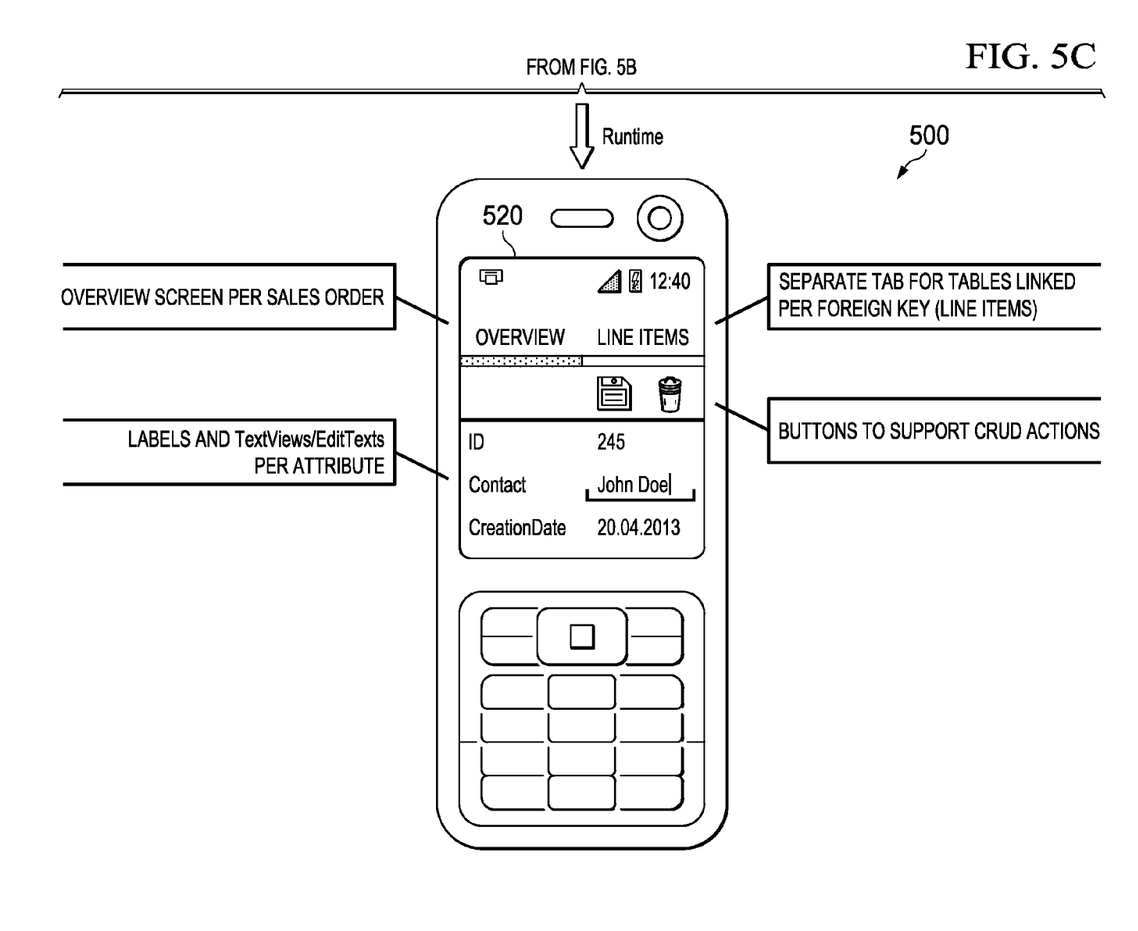

FIGS. 5A, 5B, and 5C include several illustrations 500, including a pair of sample database tables 505 and 510 (FIG. 5A), an XML file 515 generated by the mobile application generator that represents a set of view information for an Android™ application (FIG. 5B), and an example screenshot 520 of an example application executing at runtime on an Android-based mobile device (FIG. 5C). The Sales Orders table 505 and the Line Items table 510 illustrate a set of underlying database information that can be accessed by the mobile application generator in the prior examples and descriptions. In accessing the Sales Orders table 505 for use in the mobile application, the DBMS and the mobile application generator can determine that the field "ID" in the Sales Orders table 505 is linked as a foreign key to particular sales orders included in the Line Items table 510. Based on this link, the developer may be able to select both tables for inclusion in the mobile application, or the mobile application generator may automatically determine the relationship and include the Line Items table 510 in the generated functionality and presentation.

Upon selection of the database tables 505 and 510, the mobile application generator can create the source code for executing the mobile application (not shown), as well as a design document providing information on how the application will be presented. That design is defined within the XML file 515. The XML file 515 is easily editable to provide changes to the presentation (e.g., changing field names, etc.). The screenshot 520 illustrates the executing mobile application providing information on sales orders and line items included in the database tables 505 and 510. Data in the respective fields can be created, read, updated, and deleted, as appropriate. Here, an overview screen provides information on individual sales orders included in the Sales Order table 505, and allows a separate tab for the Line Item tables 510 linked by a foreign key from within the Sales Order table 505.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
presenting, in response to a request to generate a native mobile application for performing operations on a database, a list of at least one table within the database;
receiving, in response to an identification of at least one table from the presented list, a selection of at least a portion of the at least one presented table within the database to be associated with the native mobile application;
retrieving at least a set of metadata associated with the selected portion of the at least one table within the database;
automatically generating a set of mobile application source code for directly accessing the selected portion of the at least one table within the database based on the set of retrieved metadata;
automatically generating a set of view definitions for the native mobile application concurrently with the set of mobile application source code, the set of view definitions defining how data associated with the native mobile application and retrieved from the database is presented;
receiving at least one modification to both the automatically generated set of mobile application source code and to the automatically generated set of view definitions from a developer prior to compiling the set of mobile application source code and the modified set of view definitions; and
compiling the modified set of mobile application source code and the modified set of view definitions into a distributable native mobile application, the distributable native mobile application configured to directly access the identified at least one table of the database associated with the native mobile application via a database management system without accessing an application layer between the native mobile application and the database.

2. The method of claim 1, wherein the presenting, receiving, retrieving, generating, and compiling operations are performed at design time.

3. The method of claim 2, wherein, at runtime, the native mobile application is executable by a mobile device and, during runtime execution, sends requests for database-related information directly to the identified database associated with the native mobile application.

4. The method of claim 1, wherein the retrieved metadata defines at least a portion of a data model of the at least one table within the database.

5. The method of claim 1, wherein receiving a selection of at least a portion of the at least one presented table within the identified database includes receiving a selection of the at least a portion of the at least one presented table within the identified database from a developer interacting with a mobile application generator used to generate the native mobile application.

6. The method of claim 1 further comprising identifying a mobile platform upon which the native mobile application is to execute, and wherein compiling the set of mobile application source code into the distributable native mobile application includes compiling the set of mobile application source code into the native distributed mobile application specifically for the identified mobile platform.

7. The method of claim 1, wherein generating the set of mobile application source code for directly accessing the selected portion of the at least one table within the database based on the set of retrieved metadata includes source code for causing direct connectivity to the identified at least one table of the database via the database management system.

8. The method of claim 7, wherein the source code for causing direct connectivity to the identified at least one table of the database via the database management system includes source code for initiating a call to the database management system associated with the identified database via a RESTful application programming interface.

9. The method of claim 1, wherein the generated set of view definitions for the native mobile application is in an editable extensible markup language (XML) format.

10. The method of claim 9, wherein the generated set of view definitions is edited at design time after generation.

11. The method of claim 1, wherein the database is an in-memory database system, and wherein the database management system is included within the in-memory database system.

12. A computer program product, the computer program product comprising computer-readable instructions embodied on tangible, non-transitory media, the instructions operable when executed by at least one computer to:
present, in response to a request to generate a native mobile application for performing operations on a database, a list of at least one table within the database;
receive, in response to an identification of at least one table from the presented list, a selection of at least a portion of the at least one presented table within the database to be associated with the native mobile application;
retrieve at least a set of metadata associated with the selected portion of the at least one table within the database;
automatically generate a set of mobile application source code for directly accessing the selected portion of the at least one table within the database based on the set of retrieved metadata;
automatically generate a set of view definitions for the native mobile application concurrently with the set of mobile application source code, the set of view definitions defining how data associated with the native mobile application and retrieved from the database is presented;
receive at least one modification to both the automatically generated set of mobile application source code and to the automatically generated set of view definitions from a developer prior to compiling the set of mobile application source code and the modified set of view definitions; and identify, prior to compilation of the set of mobile application source code, a mobile platform upon which the native mobile application is to execute; and compile the modified set of mobile application source code and the modified set of view definitions into a distributable native mobile application based on a set of compiling rules associated with the identified mobile platform, the distributable native mobile application configured to directly access the identified at least one table of the database associated with the native mobile application via a database management system without accessing an application server between the native mobile application and the database.

13. The article of claim 12, wherein the presenting, receiving, retrieving, generating, and compiling operations are performed at design time operations of the product.

14. The article of claim 12, wherein the retrieved metadata defines at least a portion of a data model of the at least one table within the database.

15. The article of claim 12, wherein receiving a selection of at least a portion of the at least one presented table within the identified database includes receiving a selection of the at least a portion of the at least one presented table within the identified database from a developer interacting with a mobile application generator used to generate the native mobile application.

16. The article of claim 12, wherein generating the set of mobile application source code for directly accessing the selected portion of the at least one table within the database based on the set of retrieved metadata includes source code for causing direct connectivity to the identified at least one table of the database via the database management system.

17. The article of claim 16, wherein the source code for causing direct connectivity to the identified at least one table of the database via the database management system includes source code for initiating a call to the database management system associated with the identified database via a RESTful application programming interface.

18. A system, comprising:
memory operable to store computer-readable instructions for mobile application generator and at least one database; and
at least one hardware processor interoperably coupled to the memory and operable to perform instructions to:
present, in response to a request to generate a native mobile application for performing operations on a database, a list of at least one table within the database;
receive, in response to an identification of at least one table from the presented list, a selection of at least a portion of the at least one presented table within the database to be associated with the native mobile application;
retrieve at least a set of metadata associated with the selected portion of the at least one table within the database;
automatically generate a set of mobile application source code for directly accessing the selected portion of the at least one table within the database based on the set of retrieved metadata;
automatically generate a set of view definitions for the native mobile application concurrently with the set of mobile application source code, the set of view definitions defining how data associated with the native mobile application and retrieved from the database is presented;

receive at least one modification to both the automatically generated set of mobile application source code and to the automatically generated set of view definitions from a developer prior to compilation of the set of mobile application source code and the modified set of view definitions; and
compile the modified set of mobile application source code and the modified set of view definitions into a distributable native mobile application, the distributable native mobile application configured to directly access the identified at least one table of the database associated with the native mobile application via a database management system without accessing an application server between the native mobile application and the database.

19. A computer-implemented method comprising:
presenting, in response to a request to generate a native mobile application for performing operations on a database, a list of at least one table within the database;
identifying, at design time of a native mobile application, at least a portion of the at least one presented table within the database to be associated with the native mobile application, where identifying includes receiving a selection of the at least a portion of the at least one presented table within the database from a developer interacting with a mobile application generator used to generate the mobile application;
retrieving, at design time of the native mobile application, at least a set of metadata associated with the selected portion of the at least one table within the database, wherein the retrieved metadata defines at least a portion of a data model of the at least one table within the database;
automatically generating, at design time of the native mobile application, a set of mobile application source code for directly accessing the selected portion of the at least one table within the database based on the set of retrieved metadata;
automatically generating, at design time of the native mobile application, a set of view definitions for the mobile application concurrently with the set of mobile application source code, the set of view definitions defining how data associated with the native mobile application and retrieved from the identified database is presented within the mobile application;
receiving at least one modification to both the automatically generated set of mobile application source code and to the automatically generated set of view definitions from a developer prior to compiling the set of mobile application source code and the modified set of view definitions;
identifying, prior to compiling the set of mobile application source code, a mobile platform upon which the native mobile application is to execute;
compiling, at design time of the native mobile application, the modified set of mobile application source code and the modified set of view definitions into a distributable native mobile application based on a set of compiling rules associated with the identified mobile platform, the distributable native mobile application configured to directly access the identified at least one table of the database associated with the native mobile application; and
wherein, at runtime of the native mobile application, the native mobile application is executable by a mobile device and, during runtime execution of the native mobile application, the native mobile application sends requests for database-related information directly to the identified database associated with the native mobile application via a database management system without accessing an application layer between the native mobile application and the database.

* * * * *